United States Patent
Park et al.

(10) Patent No.: US 10,479,205 B2
(45) Date of Patent: Nov. 19, 2019

(54) PLUG-IN VEHICLE AND METHOD OF CONTROLLING THE SAME

(71) Applicants: Hyundai Motor Company, Seoul (KR); Kia Motors Corporation, Seoul (KR)

(72) Inventors: Dae Ro Park, Gyeonggi-do (KR); Sang Joon Kim, Seoul (KR); Soung Han Noh, Gyeonggi-do (KR); Jin Cheol Shin, Seoul (KR); Seung Jae Yoo, Gyeonggi-do (KR); Seok Young Yun, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/351,952

(22) Filed: Nov. 15, 2016

(65) Prior Publication Data
US 2018/0001771 A1  Jan. 4, 2018

(30) Foreign Application Priority Data
Jul. 1, 2016  (KR) .................. 10-2016-0083343

(51) Int. Cl.
*B60L 3/00* (2019.01)
*B60L 58/12* (2019.01)
*B60L 53/16* (2019.01)

(52) U.S. Cl.
CPC ............. *B60L 3/0084* (2013.01); *B60L 53/16* (2019.02); *B60L 58/12* (2019.02);
(Continued)

(58) Field of Classification Search
CPC ............... B60L 3/0084; B60L 11/1818; B60L 11/1861; B60L 2260/26; Y10S 903/903; G01R 31/02; H02J 7/00
See application file for complete search history.

(56) References Cited

U.S. PATENT DOCUMENTS

2010/0001687 A1* 1/2010 Watanabe .................. B60L 3/12
320/109
2010/0320018 A1* 12/2010 Gwozdek ................ B60T 17/18
180/65.27

(Continued)

FOREIGN PATENT DOCUMENTS

JP    H06-343204 A    12/1994
JP    2013-111311 A    6/2013

(Continued)

OTHER PUBLICATIONS

Tesla Forum: "Driving off while connected to charging?" Author: member name = "toby_wan_kenoby"; Date: Jul. 16, 2013 https://forums.tesla.com/forum/forums/driving-while-connected-charging (Year: 2013).*

*Primary Examiner* — Thomas E Worden
(74) *Attorney, Agent, or Firm* — Mintz Levin Cohn Ferris Glovsky and Popeo, P.C.; Peter F. Corless; Kongsik Kim

(57) ABSTRACT

A plug-in vehicle is provided which prevents impossibility of driving even when a charging connector is not connected to the vehicle and a method of controlling the same. The method includes determining whether the vehicle is stopped and determining whether recognition of a connection of the charging connector to the vehicle is enabled. Additionally, the method includes determining whether a charging inlet door is open or closed, in response to determining that recognition of the connection of the charging connector to the vehicle is disenabled, and executing transition of the vehicle from a first state restricting generation of driving power to a second state permitting generation of driving power when the charging inlet door is closed.

4 Claims, 4 Drawing Sheets

(52) U.S. Cl.
CPC ....... *B60L 2240/12* (2013.01); *B60L 2250/10* (2013.01); *B60L 2250/12* (2013.01); *B60L 2260/26* (2013.01); *Y02T 10/7005* (2013.01); *Y02T 10/705* (2013.01); *Y02T 10/7044* (2013.01); *Y02T 10/7072* (2013.01); *Y02T 90/14* (2013.01); *Y10S 903/903* (2013.01)

(56) References Cited

U.S. PATENT DOCUMENTS

| | | | | |
|---|---|---|---|---|
| 2011/0178663 | A1* | 7/2011 | Crombez | B60K 28/10 |
| | | | | 701/22 |
| 2011/0295456 | A1* | 12/2011 | Yamamoto | B60K 6/445 |
| | | | | 701/22 |
| 2012/0286730 | A1* | 11/2012 | Bonny | B60L 11/1827 |
| | | | | 320/109 |
| 2014/0244090 | A1* | 8/2014 | Schygge | B60K 28/00 |
| | | | | 701/22 |
| 2015/0066257 | A1* | 3/2015 | Ochocinski | B60K 28/066 |
| | | | | 701/22 |
| 2017/0136900 | A1* | 5/2017 | Murata | B60L 11/1809 |
| 2017/0349162 | A1* | 12/2017 | Kim | B60L 11/1861 |

FOREIGN PATENT DOCUMENTS

| | | |
|---|---|---|
| KR | 10-2012-0005725 A | 1/2012 |
| KR | 10-1155537 B1 | 6/2012 |
| KR | 10-2014-0117878 A | 10/2014 |
| KR | 2015-0089646 A | 8/2015 |
| KR | 10-2015-0109153 A | 10/2015 |

* cited by examiner

PLUG-IN VEHICLE AND METHOD OF CONTROLLING THE SAME

CROSS REFERENCE TO RELATED APPLICATION(S)

This application claims the benefit of Korean Patent Application No. 10-2016-0083343, filed on Jul. 1, 2016, which is hereby incorporated by reference as if fully set forth herein.

BACKGROUND

Field of the Invention

The present disclosure relates to a plug-in vehicle which charges an internal battery through a charging connector from an external charger and a method of controlling the same, and more particularly, to a plug-in vehicle which prevents impossibility of driving even when a charging connector is not connected to the vehicle and a method of controlling the same.

Discussion of the Related Art

In general, a hybrid electric vehicle (HEV) refers to a vehicle using two types of power sources, i.e., an engine and an electric motor. Such a hybrid electric vehicle has improved fuel efficiency and power performance and also effectively reduces exhaust gas, as compared to a vehicle including only an internal combustion engine.

Among hybrid electric vehicles, a plug-in hybrid electric vehicle (PHEV) includes a plug connected to the vehicle and a battery to drive an electric motor may be charged with external power. Further, as another type of eco-friendly vehicle, electric vehicles (EVs) are driven using an electric motor and thus require charging of a battery to drive the electric motor.

The above-described EV or PHEV, which executes charging using an external charger, is subject to high-voltage electrical safety regulations in some nations to secure safety when a charging connector is physically fastened to the EV or PHEV. For example, in Europe, when an external charging cable is connected to a vehicle, regulations require that the vehicle be incapable of being driven by driving power thereof. To satisfy these safety regulations or to prevent accidents of general drivers, auto manufacturers limit some functions when a vehicle is unable to confirm whether an external charging cable is connected to the vehicle.

In particular, a vehicle generally determines whether an external charging cable is connected to the vehicle by sensing whether a connector physically approaches the vehicle. However, when a device configured to sense such approach is defective (e.g., short-circuit of a signal line) or some controllers (e.g., an on-board charger: OBC) related to a charging process are in a non-communication state, the vehicle may be unable to confirm whether the charging cable is connected to the vehicle. Accordingly, many auto manufacturers do not permit vehicle starting as well as vehicle driving to secure safety and to satisfy regulations.

When a vehicle may is unable to directly sense whether a connector is coupled to the vehicle, limiting driving power of the vehicle may be advantageous in terms of safety guarantee. However, when vehicle starting is not permitted due to simple failure of a sensing device under the condition that the connector is not actually coupled to the vehicle, the vehicle needs to be towed to a repair shop to repair the corresponding device, thus decreasing user convenience.

SUMMARY

Accordingly, the present disclosure is directed to a plug-in vehicle and a method of controlling the same that substantially obviate one or more problems due to limitations and disadvantages of the related art.

An object of the present disclosure is to provide a plug-in vehicle and a method of controlling the same which may permit driving of the plug-in vehicle, in which a battery may be charged by wire (e.g., a wired connection) using external power, while guaranteeing safety based on whether a charging connector is connected to the vehicle. Another object of the present disclosure is to provide a plug-in vehicle and a method of controlling the same which may permit driving of the vehicle when a charging connector is not actually connected to the vehicle, under the condition that the vehicle has difficulty sensing whether the charging connector is connected to the vehicle.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these objects and other advantages and in accordance with the purpose of the disclosure, as embodied and broadly described herein, a method of controlling a plug-in vehicle may include determining whether the vehicle is stopped, determining whether recognition of a connection of a charging connector to the vehicle is enabled, in response to determining that the vehicle is stopped, determining whether a charging inlet door is open or closed, in response to determining that recognition of connection of the charging connector to the vehicle is disenabled, and executing transition of the vehicle from a first state not permitting generation of driving power to a second state permitting generation of driving power, in response to determining that the charging inlet door is closed.

In another aspect of the present disclosure, a plug-in vehicle may include a first controller configured to recognize whether a charging connector is connected to the vehicle, a second controller configured to recognize whether a charging inlet door is open or closed, and a third controller configured to determine whether the charging inlet door is open or closed through the second controller, when the vehicle is stopped and recognition of connection of the charging connector to the vehicle through the first controller is disenabled, and to execute transition of the vehicle from a first state not permitting generation of driving power to a second state permitting generation of driving power, in response to determining that the charging inlet door is closed.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate exemplary embodiment(s) of the disclosure and together with the description serve to explain the principle of the disclosure. In the drawings.

DETAILED DESCRIPTION

Figure 1:
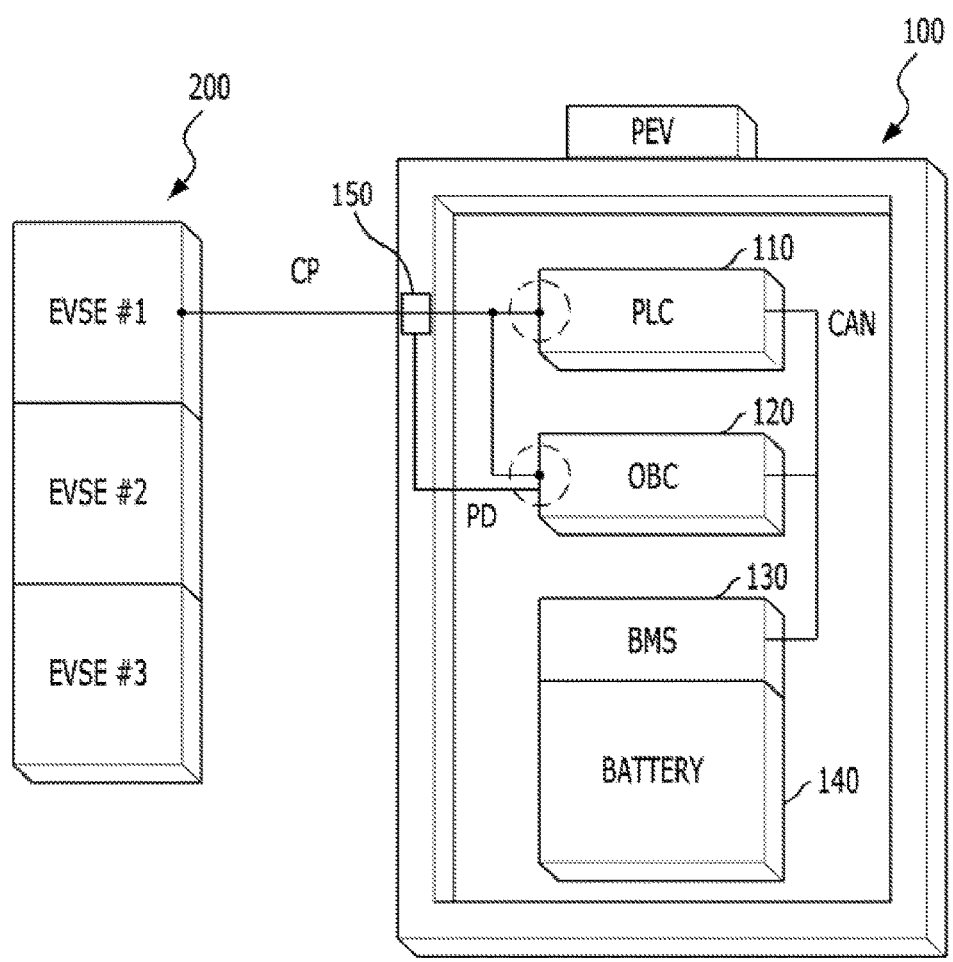
FIG. 1 is a schematic view exemplarily illustrating the structure of a charging system of a general vehicle in accordance with one exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Reference will now be made in detail to the exemplary embodiments of the present disclosure, examples of which are illustrated in the accompanying drawings. In the drawings, the same or similar elements are denoted by the same reference numerals even though they are depicted in different drawings. The suffixes "module" and "unit" used in the description below are given or used together only in consideration of ease in preparation of the specification and do not have distinctive meanings or functions.

In the following description of the present disclosure, a detailed description of known functions and configurations incorporated herein will be omitted when it may make the subject matter of the present disclosure rather unclear. In addition, the accompanying drawings serve only to easily describe the exemplary embodiments disclosed in the specification but do not limit the technical spirit disclosed in the specification, and it will be understood that the embodiments include various modifications, equivalences, and substitutions, without departing from the scope and spirit of the disclosure as disclosed in the accompanying claims. Further, in the specification, it will be assumed that the term "battery" means a battery to supply power to an electric motor for driving a vehicle not a 12V battery used to operate electric components of a general vehicle, unless stated otherwise.

Prior to description of an external charging system of a vehicle in accordance with exemplary embodiments of the present disclosure, the structure of a charging system of a general vehicle will be described with reference to FIG. 1. FIG. 1 is a schematic view exemplarily illustrating the structure of a wired charging system of a general vehicle. Although FIG. 1 illustrates a charging system of an electric vehicle (EV) or a plug-in electric vehicle (PEV), the charging system of FIG. 1 may be similarly applied to a PHEV except for a portion related to an engine driven by fossil fuel.

With reference to FIG. 1, a charging system 100 of an electric vehicle may include a power line communication (PLC)/electric vehicle communication controller (EVCC) 110 to execute rapid charging, an on-board charger (OBC) 120 to execute slow charging, a battery management system (BMS) 130, a battery 140 and a charging connector sensor 150. The PLC/EVCC 110, the OBC 120 and the BMS 130 may be connected via controller area network (CAN) communication. Further, the charging system 100 may be connected to electric vehicle supply equipment (EVSE) 200 via a charging connector. The EVSE 200 may be configured to transmit a pulse width modulation (PWM) signal to the vehicle via a control/pilot (C/P) line, and the vehicle may be configured to determine whether the vehicle is in a slow charging state or a rapid charging state through a PWM signal duty ratio (i.e., a ratio of a signal L to a signal H of a pulse width).

Further, the charging connector sensor 150 may be configured to sense whether the charging connector is coupled to a charging inlet of the vehicle using a proximity detection method, and a signal that corresponds to a sensing result may be transmitted to the OBC 120 via a proximity detection (PD) line. Therefore, the OBC 120 may be configured to sense whether the PD line is defective, i.e., is short-circuited, by monitoring a signal state of the PD line, and inform the BMS 130 of a sensing result.

The BMS 130 may be configured to detect whether a failure, such as a communication disenabled state with the OBC 120 (e.g., CAN timeout), occurs and, when abnormality or malfunction, such as failure of the OBC 120 or short-circuit of the PD line, is sensed, inform a proper high-level controller of the abnormality according to the configuration of a driving system. For example, the high-level controller may be a hybrid control unit (HCU) for a hybrid vehicle system or a vehicle control unit (VCU) for an electric vehicle system, but is not limited thereto.

One exemplary embodiment of the present disclosure proposes a method in which a sensor configured to sense whether a charging inlet door is open to allow a vehicle to drive in response to determining that a charging connector is not connected to the vehicle (e.g., the vehicle may continue being driven when the connector is not coupled to the vehicle and the charging door is closed) and possibility of driving the vehicle may be determined according to a sensing result by the corresponding sensor, while satisfying electric safety regulations.

In accordance with one aspect of this exemplary embodiment, possibility of driving the vehicle may be determined by whether state change of the vehicle is allowed. For example, when driving of the vehicle is restricted or blocked, change of an EV not ready state or an HEV not ready state to an EV/HEV ready state of the vehicle may be restricted according to driving systems. Further, in response to determining that driving of the vehicle is allowed or permitted, change of the EV/HEV not ready state to the EV/HEV ready state of the vehicle may be executed. Particularly, the EV/HEV ready state may mean a state in which a sequence of events executed in a vehicle system to drive the vehicle (e.g., system power on, function self-checkup, immobilizer authentication, main relay on, etc.) is successfully executed and the vehicle is ready to be driven using driving power generated by a powertrain of the vehicle when a transmission is switched to a drive gear. In other words, the EV/HEV ready state may mean a state in which an internal combustion vehicle is started up. Further, the EV/HEV not ready state may mean a state in which a vehicle is not ready to be driven due to incompletion of at least one of a sequence of events, etc.

In accordance with one aspect of this exemplary embodiment, whether the charging inlet door is opened may be considered to determine whether driving of the vehicle is allowed when whether the charging connector is connected to the vehicle may not be recognized (e.g., short-circuit of the PD line, OBC CAN timeout, etc.). Further, in accordance with one aspect of this exemplary embodiment, a sensor configured to detect whether the charging inlet door is open may be configured to output a sensing signal to a body control module (BCM), and the BCM may be configured to transmit a recognition result based on the sensing signal to a high-level controller (e.g., the HCU or VCU) configured to operate various components of the driving system.

The sensor configured to sense whether the charging inlet door is open is not limited to any recognition type, such as touch recognition, proximity recognition or contact point recognition, as long as the sensor is capable of sensing whether the charging inlet door is open. Moreover, in accordance with one aspect of this exemplary embodiment, whether the vehicle is stopped (or the speed of the vehicle is a predetermined speed or less) may be first determined.

Figure 2:
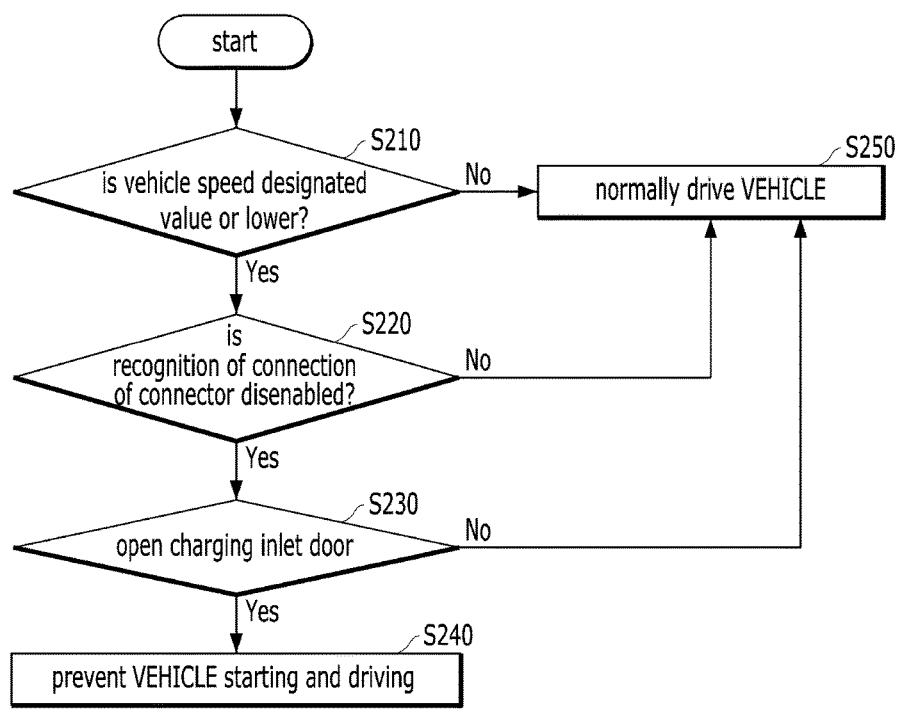
FIG. 2 is a flowchart exemplarily illustrating a process of controlling a vehicle when recognition as to whether a charging connector is connected to the vehicle is disenabled in accordance with one exemplary embodiment of the present disclosure.

FIG. 2 illustrates a process of controlling a vehicle in accordance with the above-described exemplary embodiment of the present disclosure. In FIG. 2, it may be assumed that a high-level or upper controller (e.g., an HCU or VCU) is configured to determine respective operations to operate respective control units for driving the vehicle.

With reference to FIG. 2, whether the vehicle is stopped may be determined first (Operation S210). In particular, whether the vehicle is stopped may be determined by determining, using a speed sensor, whether a vehicle speed is a predetermined speed or less (or zero). When recognition of connection of the charging connector to the vehicle is disenabled in response to determining that the vehicle is stopped (Operation S220), the controller may be configured to determine whether the charging inlet door is open (Operation S230).

Particularly, when recognition of connection of the charging connector to the vehicle is disenabled may include determining that the OBC 120 senses short-circuit of the PD line or that the BMS 130 senses CAN timeout of the OBC 120. Further, whether the charging inlet door is open may be sensed by a sensor configured to sense opening and closing of the charging inlet door, and a sensing result may be transmitted to the BCM. Therefore, the high-level controller may be configured to receive failure information, such as whether the OBC 120 is defective or whether the PD line is short-circuited, from the BMS 130, and receive information regarding opening and closing of the charging inlet door from the BCM.

In response to determining that the charging inlet door is open, the high-level controller may be configured to restrict the vehicle from starting to drive (i.e., interrupt transition to the HEV/EV ready state, Operation S240). When the vehicle speed exceeds the predetermined speed and the controller determines that the vehicle is stopped, when recognition of connection of the connector to the vehicle is enabled and the controller determines that the charging connector is not connected to the vehicle, and that the charging inlet door is closed, the high-level controller may be configured to permit the vehicle to normally drive (Operation S250).

The normal driving of the vehicle may be permitted because the vehicle speed exceeds the predetermined speed, the controller maybe configured to determine that the vehicle has been driven already and other determinations may be omitted, and closing of the charging inlet door indicates a disconnection of the charging connector from the vehicle.

The above-described process will be summarized in Table 1 below.

TABLE 1

| Driving situation Condition | During starting (prior to HEV/EV ready) | After starting (during HEV/EV ready) |
|---|---|---|
| Connection of connector sensed | Starting disenabled | Not ready if condition is sensed at a vehicle speed of 0 kph (ignored when condition is sensed during driving) |
| Recognition of connection of connector disenabled | Starting enabled | Normal driving |

TABLE 1-continued

| Driving situation Condition | During starting (prior to HEV/EV ready) | After starting (during HEV/EV ready) |
| --- | --- | --- |
| Recognition of connection of connector disenabled & charging door opened | Starting disenabled | Not ready if condition is sensed at a vehicle speed of 0 kph (ignored when condition is sensed during driving) |

Another exemplary embodiment of the present disclosure provides a method in which charging of a battery is normally executed when a vehicle is stopped and then, when recognition of connection of a charging connector to the vehicle is disenabled, driving of the vehicle may be permitted. In particular, to more firmly guarantee safety, a driver may be informed of such a state, confirmation may be fed back and then driving of the vehicle may be allowed.

Figure 3:
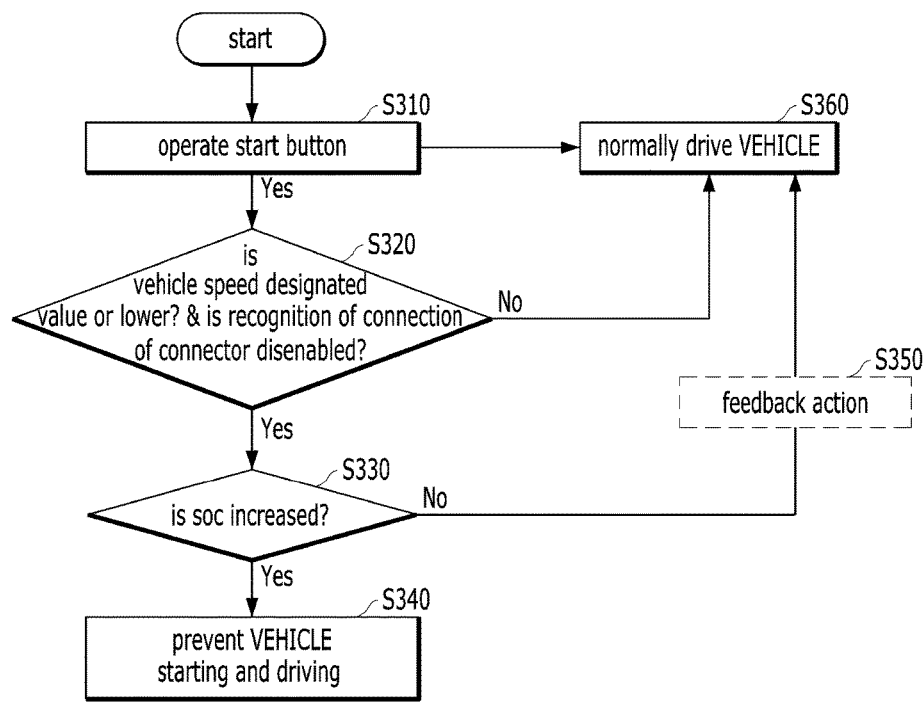
FIG. 3 is a flowchart exemplarily illustrating a process of controlling a vehicle when recognition as to whether a charging connector is connected to the vehicle is disenabled in accordance with another exemplary embodiment of the present disclosure.

FIG. 3 is a flowchart exemplarily illustrating a process of controlling a vehicle when recognition as to whether a charging connector is connected to the vehicle is disenabled in accordance with another exemplary embodiment of the present disclosure. With reference to FIG. 3, when a driver operates a start button (Operation S310), the controller may be configured to determine whether transition to the EV/HEV ready state is allowed. For this purpose, the controller may be configured to confirm whether the vehicle is stopped (i.e., whether a vehicle speed is a predetermined speed or less) and whether recognition of connection of a charging connector to the vehicle is disenabled (Operation S320). As a result of confirmation, when the vehicle is stopped and recognition of connection of the charging connector to the vehicle is disenabled, the controller may be configured to determine whether a state of charge (SOC) of a battery is increased by a predetermined value or a predetermined rate, as compared to the previous driving cycle (Operation S330).

When the SOC of the battery is not increased or an increase of the SOC of the battery is insufficient, the controller may be configured to block or restrict the vehicle from starting or driving (Operation S340), indicating that an OBC or a PD line is defective prior to charging or during charging. Further, when the SOC of the battery is increased, the controller may be configured to determine that the OBC or the PD is operated normally (e.g., without error or malfunction) and thus charging may be executed at least during charging and thus normal driving of the vehicle may be permitted (Operation S360). In particular, to increase safety, feedback action may be executed before generation of driving power is allowed (Operation S350).

The feedback action may be executed using a method in which visual output (e.g., display of a warning, lighting-on of a warning lamp, etc.), audible output (e.g., output of a guide voice or a warning sound, etc.) and/or tactile output (e.g., output of vibration), requesting a driver to confirm whether connection of a charging connector to the vehicle is released, may be generated, or, together with generation of such output, the driver may be requested to operate a specific pattern as an indication of completion of confirmation. Particularly, operation of a specific pattern may include that the driver slightly turns a steering wheel left and right or engages a brake pedal a designated number of times. However, such a method is merely exemplarily and operation of a specific pattern is not limited thereto so long as the controller is capable of confirming whether the driver operates the specific pattern. When operation of the specific pattern is sensed, the controller may be configured to permit transition of the vehicle to the HEV/EV ready state to generate driving power.

Of course, in the above-described process of FIG. 3, whether a sensor configured to sense opening and closing of a charging inlet door is defective may be additionally considered (i.e., when recognition of connection of the charging connector to the vehicle is disenabled, when the vehicle is stopped, and failure of the sensor configured to open and close the charging inlet door is sensed, whether increase of an SOC of a battery may be determined).

Figure 4:
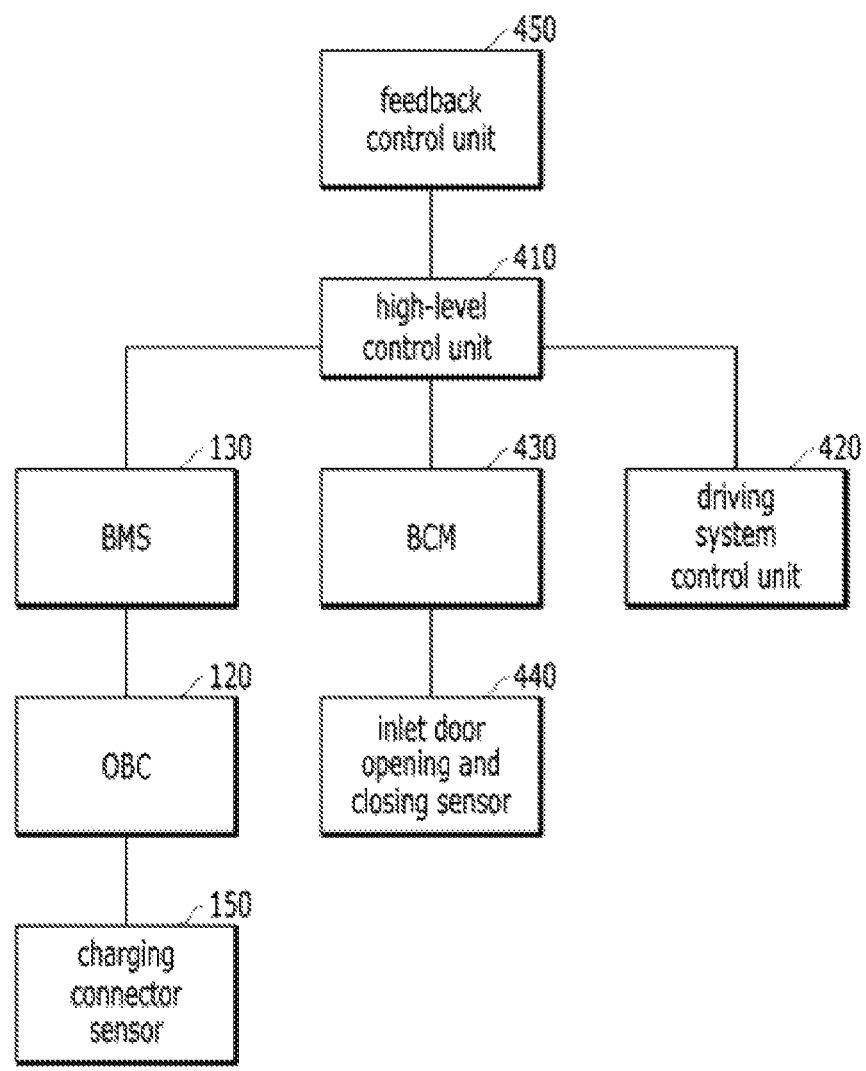
FIG. 4 is a block diagram exemplarily illustrating a vehicle structure in accordance with one exemplary embodiment of the present disclosure.

Furthermore, with reference to FIG. 4, control units regarding operation of a vehicle structure in accordance with one of the above exemplary embodiments of the present disclosure will be described. FIG. 4 is a block diagram exemplarily illustrating a vehicle structure in accordance with one exemplary embodiment of the present disclosure. In FIG. 4, operations of a BMS 130, an OBC 120 and a charging connector sensor 150 are described above with reference to FIG. 1 and operations of a BCM 430 and an inlet door opening and closing sensor 440 are described above with reference to FIGS. 2 and 3 and a detailed description thereof will thus be omitted because it is considered to be unnecessary.

A driving system controller 420 may include a plurality of controllers as part of driving systems (e.g., HEV/EV). For example, for an HEV and an EV, the driving system controller 420 may include a motor control unit configured to operate a driving motor and a transmission control unit configured to operate a transmission. In the HEV, the driving system controller 420 may further include an engine management system (EMS) configured to operate an engine and, particularly, for a transmission mounted electric device (TMED)-type hybrid electric vehicle, the driving system controller 420 may further include a clutch control unit configured to operate an engine clutch that connects the motor and the engine. A high-level controller 410 may be configured to acquire information regarding various operating states of the vehicle from the driving system controller 420, the BMS 130 and the BCM 430 and determine whether driving power is generated (i.e., whether transition to the HEV/EV ready state is allowed).

In accordance with another exemplary embodiment of the present disclosure, a feedback controller 450 may be additionally provided. The feedback controller 450 may be divided into an output system controller configured to request a driver to execute feedback, and a sensing system controller configured to sense driver operation input based on a request. The output system controller may include the above-described BCM, a cluster controller, or a head unit controller configured to operate a navigation display based on output types. The sensing system controller may include a brake controller configured to operate a brake pedal sensor or a steering controller configured to operate a steering wheel according to operation patterns, which the driver is requested to execute, but is not limited thereto.

The above-described method in accordance with the present disclosure may be implemented as computer readable code stored in a computer readable recording medium. Computer readable recording media include all types of computer readable recording devices in which data readable by computers is stored. For example, the non-transitory computer readable recording media include a Hard Disk Drive (HDD), a Solid State Drive (SSD), a Silicon Disk Drive (SDD), a ROM, a RAM, a CD-ROM, a magnetic tape, a floppy disk, an optical data storage device, etc. Further, the computer readable recording media may be realized in the form of a carrier wave (for example, transmission over the Internet).

As apparent from the above description, a plug-in vehicle in accordance with at least one exemplary embodiment of the present disclosure may be allowed to drive while satisfying safety regulations, when trouble regarding connection of a charging connector to the vehicle occurs. Particularly, a situation in which the charging connector is not actually connected to the vehicle may be determined by determining whether a charging inlet door is open and change of an SOC of a battery, thus allowing generation of driving power.

It will be apparent to those skilled in the art that various modifications and variations can be made in the present disclosure without departing from the spirit or scope of the disclosure. Thus, it is intended that the present disclosure cover the modifications and variations of this disclosure provided they come within the scope of the appended claims and their equivalents.

What is claimed is:

1. A plug-in vehicle, comprising:
   a first controller configured to recognize whether a charging connector is connected to the vehicle;
   a second controller configured to recognize whether a charging inlet door is open or closed; and
   a third controller configured to determine whether the charging inlet door is open or closed through the second controller when the vehicle is stopped and recognition of a connection of the charging connector to the vehicle through the first controller is disenabled, and to execute transition of the vehicle from a first state restricting generation of driving power to a second state permitting generation of driving power, in response to determining that the charging inlet door is closed,
   wherein the recognition of the connection of the charging connector to the vehicle through the first controller is enabled further includes disenabling communication between the first controller and a fourth controller,
   wherein the fourth controller is configured to operate the first controller and to manage a battery charged with power transmitted through the charging connector,
   wherein the third controller is further configured to:
      determine whether a state of charge (SOC) of the battery is increased prior to transition of the vehicle to the second state;
      determine that charging of the battery was normally executed at least during the charging, when the SOC of the battery satisfies a designated increase reference; and
      execute transition of the vehicle from the first state to the second state, when the SOC of the battery satisfies the designated increase reference,
   wherein the third controller is configured to restrict transition of the vehicle from the first state to the second state in response to determining that the charging inlet door is open,
   wherein the third controller is configured to determine that the vehicle is stopped, in response to determining that a vehicle speed is zero or is equal to or less than a predetermined speed using a speed sensor, and
   wherein the first controller is an on-board charger (OBC), the second controller is a body control module (BCM), the third controller is a hybrid controller or an electric vehicle control unit, and the fourth controller is a battery management system (BMS).

2. The plug-in vehicle according to claim 1, further comprising a first sensor configured to:
   sense whether the charging inlet door is open or closed; and
   transmit a sensing result to the second controller,
   wherein the third controller is configured to receive the sensing result of the first sensor from the second controller.

3. The plug-in vehicle according to claim 1, wherein the third controller is configured to operate a fifth controller to output a feedback action request, when the SOC of the battery satisfies a designated increase reference, and execute transition of the vehicle to the second state, when operation corresponding to the feedback action request is sensed through a sixth controller.

4. The plug-in vehicle according to claim 1, wherein the vehicle is a plug-in hybrid electric vehicle (HEV) or electric vehicle (EV).

* * * * *